| (12) | United States Patent |
|---|---|
| | Lucchi |

(10) Patent No.: US 10,422,661 B2
(45) Date of Patent: Sep. 24, 2019

(54) DEVICE FOR MEASURING AN ANGULAR POSITION

(71) Applicant: FAIST COMPONENTI S.P.A., Montone (PG) (IT)

(72) Inventor: Elena Lucchi, Umbertide (IT)

(73) Assignee: FAIST COMPONENTI S.P.A., Montone (IT)

(*) Notice: Subject to any disclaimer, the term of this patent is extended or adjusted under 35 U.S.C. 154(b) by 133 days.

(21) Appl. No.: 15/837,713

(22) Filed: Dec. 11, 2017

(65) Prior Publication Data

US 2018/0188075 A1 Jul. 5, 2018

(30) Foreign Application Priority Data

Dec. 30, 2016 (IT) .................. 102016000132846

(51) Int. Cl.
    *G01D 5/14* (2006.01)
(52) U.S. Cl.
    CPC .................................. *G01D 5/145* (2013.01)
(58) Field of Classification Search
    CPC ..................................................... G01D 5/145
    USPC .............................................. 324/207.2, 251
    See application file for complete search history.

(56) References Cited

U.S. PATENT DOCUMENTS

| 4,789,826 | A  | 12/1988 | Willett |
| 6,130,535 | A  | 10/2000 | Herden et al. |
| 6,310,473 | B1 | 10/2001 | Zhao |
| 6,448,763 | B1 | 9/2002  | Spellman |
| 6,518,749 | B1 | 2/2003  | Oudet et al. |
| 6,873,150 | B2 | 3/2005  | Buerger et al. |
| 7,259,554 | B2 | 8/2007  | Wiese |
| 8,111,064 | B2 | 2/2012  | Wagner |
| 9,018,944 | B2 | 4/2015  | Mol |

(Continued)

FOREIGN PATENT DOCUMENTS

| DE | 102006060808 A1 | 6/2008 |
| DE | 102012203158 A1 | 8/2013 |

(Continued)

*Primary Examiner* — Farhana A Hoque
(74) *Attorney, Agent, or Firm* — Pearne & Gordon LLP

(57) ABSTRACT

A device for measuring an angular position, comprising a rotating body (3) that oscillates relative to a supporting body (2) between two limit positions which are rotated one relative to the other by an angle of oscillation θ with amplitude that is less than or equal to 150°, a permanent magnet (5) that extends along an arc of extension that corresponds to an arc of a circle centred on the main axis of rotation (4), the arc of extension subtending an angle of extension α, and a magnetic sensor (6) positioned eccentrically relative to the main axis of rotation (4); the permanent magnet (5) and the magnetic sensor (6) being fixed one to the rotating body (3) and the other to the supporting body (2), and always being magnetically coupled; the following relation applying between the angle of extension α of the permanent magnet (5) and the angle of oscillation θ:

α>θ−30°, and the permanent magnet (5) being diametrally polarized and having a direction of polarization (12) that forms an angle that is less than or equal to 10° relative to a straight line perpendicular to the main axis of rotation (4) and passing both through the main axis of rotation (4), and through a first end of the arc of extension.

19 Claims, 4 Drawing Sheets

(56) References Cited

U.S. PATENT DOCUMENTS

| | | |
|---|---|---|
| 2002/0089327 A1 | 7/2002 | Spellman |
| 2003/0042891 A1 | 3/2003 | Buerger et al. |
| 2003/0048101 A1 | 3/2003 | Tola |
| 2006/0267581 A1 | 11/2006 | Wiese |
| 2010/0060267 A1 | 3/2010 | Wagner |
| 2012/0105057 A1 | 5/2012 | Mol |
| 2013/0063134 A1 | 3/2013 | Kane et al. |
| 2013/0147466 A1* | 6/2013 | Baek ............... F02D 11/106 324/207.2 |

FOREIGN PATENT DOCUMENTS

| | | |
|---|---|---|
| DE | 102013106395 A1 | 12/2014 |
| EP | 0665416 A1 | 8/1995 |
| EP | 1291615 A2 | 3/2003 |
| WO | 88/07172 A1 | 9/1988 |
| WO | 98/08060 A1 | 2/1998 |
| WO | 98/55828 A1 | 12/1998 |
| WO | 02/061366 A2 | 8/2002 |
| WO | 2004/046653 A1 | 6/2004 |
| WO | 2007/122055 A1 | 11/2007 |
| WO | 2011/006515 A1 | 1/2011 |
| WO | 2011/139469 A1 | 11/2011 |

\* cited by examiner

DEVICE FOR MEASURING AN ANGULAR POSITION

This invention relates to a device for measuring an angular position, in particular a device of the type usable for measuring angles of rotation/oscillation that are not greater than 150°.

Knowing the angular position of rotating/oscillating mechanical elements is very important in many industrial applications.

Therefore, over time various measuring system have been developed which, at least in recent years, are all based on contactless magnetic measurements that use the interactions between a permanent magnet and a magnetic sensor (usually a Hall effect sensor).

A first known type involves the use of a magnetic sensor which is mounted so that it is axially aligned with the axis of rotation of the body whose angular position is to be measured, and magnetically coupled to a permanent magnet positioned eccentrically relative to the axis of rotation.

However, that type of devices has considerable disadvantages in terms of dimensions and is not usable whenever free axial access to the rotating body is necessary.

Therefore, in order to overcome that disadvantage, measuring systems have been developed for measuring an angular position of a rotating body relative to a fixed body, in which a magnet is mounted in such a way that it rotates together with the rotating body and a Hall effect sensor is mounted on the fixed body in a position spaced from the axis of rotation and near the magnet. Examples of this type are described patent documents WO 88/07172 A1, EP 0665416, WO 98/08060, WO 98/55828, U.S. Pat. No. 6,310,473, WO 02/061366, EP 1291615, WO 2004/046653, WO 2007/122055, DE 102006060808, WO 2011/006515, WO 2011/139469, US 2013/147466, DE 102012203158, DE 102013106395.

In more detail, in some cases the magnet has the shape of a complete circular or annular arc, whilst in other cases the magnet has the shape of a circular arc (portion of a ring if viewed axially) that only covers part of the circumference (see documents WO 98/08060, WO 98/55828, U.S. Pat. No. 6,310,473, WO 02/061366, EP 1291615 and WO 2011/139469).

Furthermore, in some prior art solutions the magnet is radially polarized (magnetized), whilst in other cases the magnet is diametrally polarized (see in particular documents U.S. Pat. No. 6,310,473, WO 2004/046653 and WO 2011/139469).

In all cases of diametrically polarized permanent magnets having the shape of a circular arc, according to the prior art only two alternative directions of polarization are always used, either the direction parallel to the chord subtended by the circular arc or the one perpendicular to that chord.

As regards the position of the Hall effect sensor relative to the magnet, in the prior art it has been positioned both radially at the side of the magnet, that is to say, on a more external or more internal circle, and above the magnet, that is to say, axially aligned.

Furthermore, in an attempt to guarantee sufficient measuring reliability, in the prior art solutions in most cases use is made of magnetic flux conveyors coupled to the permanent magnet.

After a careful study of the prior art solutions, the Applicant has concluded that none of them is completely free of disadvantages.

In particular, they generally show poor sensitivity, making them unusable in the case of oscillations to be measured which are relatively small or when good precision is necessary.

In this context the technical purpose which forms the basis of this invention is to provide a device for measuring an angular position which overcomes the above-mentioned disadvantages.

In particular, the technical purpose of this invention is to provide a device for measuring an angular position that allows the obtainment both of a continuous measuring signal, and relatively high sensitivity in the entire measuring range.

Another technical purpose of this invention is to achieve that at a competitive cost.

The technical purpose specified and the aims indicated are substantially achieved by a device for measuring an angular position as described in the appended claims.

Further features and the advantages of this invention are more apparent in the detailed description, with reference to the accompanying drawings which illustrate several preferred, non-limiting embodiments of a device for measuring an angular position, in which.

Figure 1:
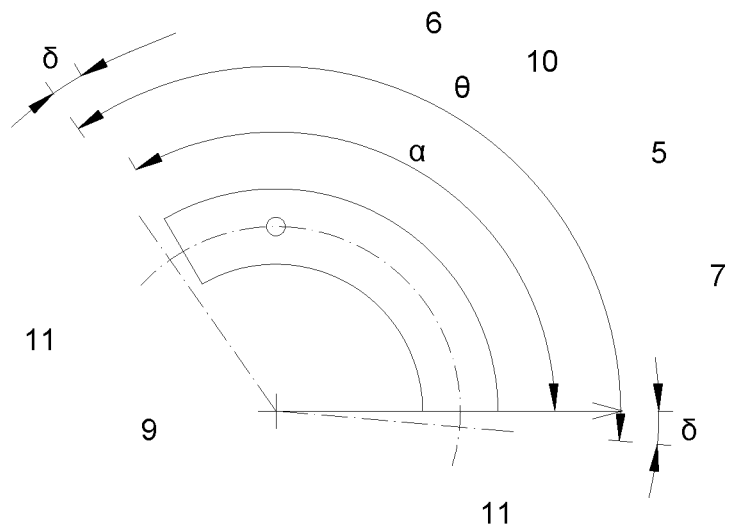
FIG. 1 is a schematic plan view (observed parallel to a main axis of rotation) of the arrangement relative to one another of a permanent magnet and a magnetic sensor which are part of the device according to this invention in an intermediate position of the measuring range.

With reference to the above-mentioned figures the numeral 1 denotes in its entirety a device for measuring an angular position according to this invention.

The heart of this invention consists of the fact that the Applicant has been able to verify that, surprisingly, it is possible to obtain an output signal that is continuous and with better resolution than the prior art devices, thanks to the use of a permanent magnet having the shape of a ring (annulus) associated with a linear magnetic sensor positioned eccentrically relative to the axis of rotation, and thanks to a particular combination of the size of the magnet, its polarization and the angle of oscillation of the magnet and sensor relative to one other.

In general, the measuring device 1 according to this invention comprises a supporting body 2 and a rotating body 3 that can rotate/oscillate relative to the supporting body 2, about a main axis of rotation 4, between two limit positions (FIGS. 4 and 5) which are rotated one relative to the other by an angle of oscillation θ with amplitude less than or equal to 150° (during normal operation, then, the rotating body 3 can't oscillate by an angle greater than 150°). This invention is even more advantageously applied when the angle of oscillation θ has an amplitude greater than or equal to 90°.

Figure 3:
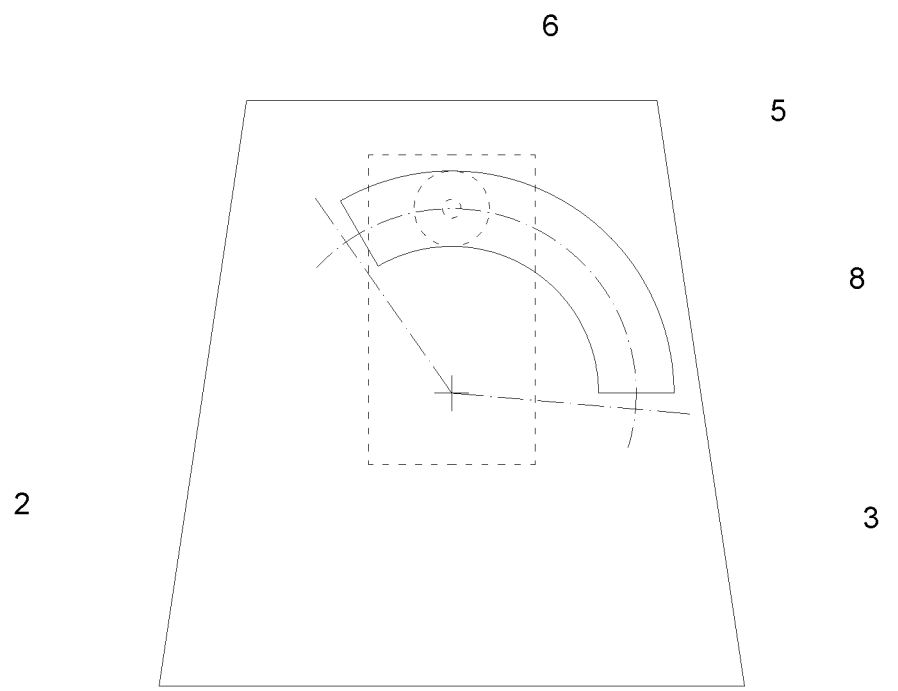
FIG. 3 is a schematic plan view of a measuring device according to this invention with the magnetic sensor and the permanent magnet in an intermediate position relative to one another.
Figure 4:
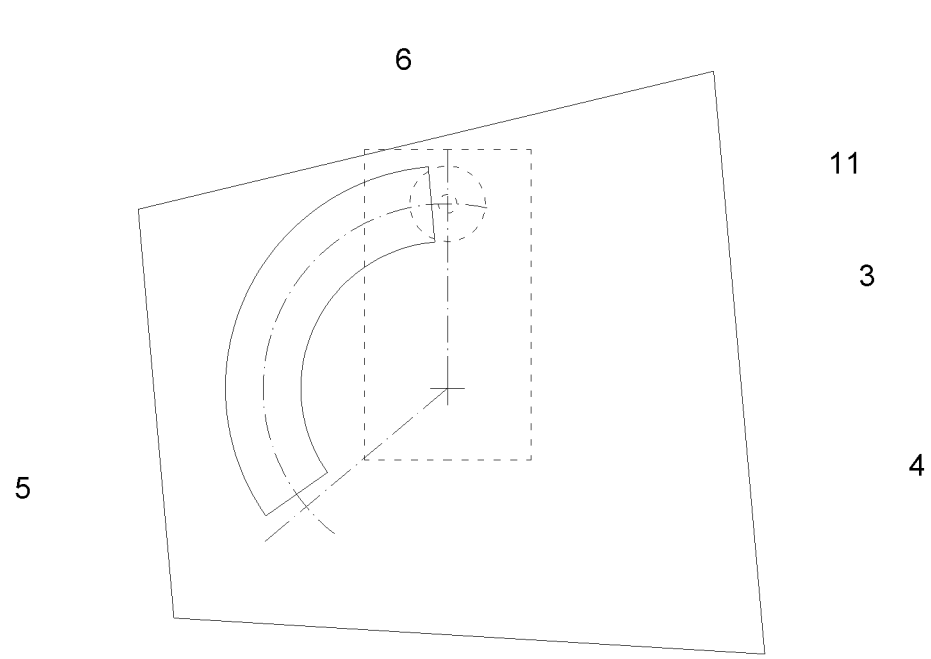
FIG. 4 shows the measuring device of FIG. 3 with the magnetic sensor and the permanent magnet in a first limit position relative to one another.
Figure 5:
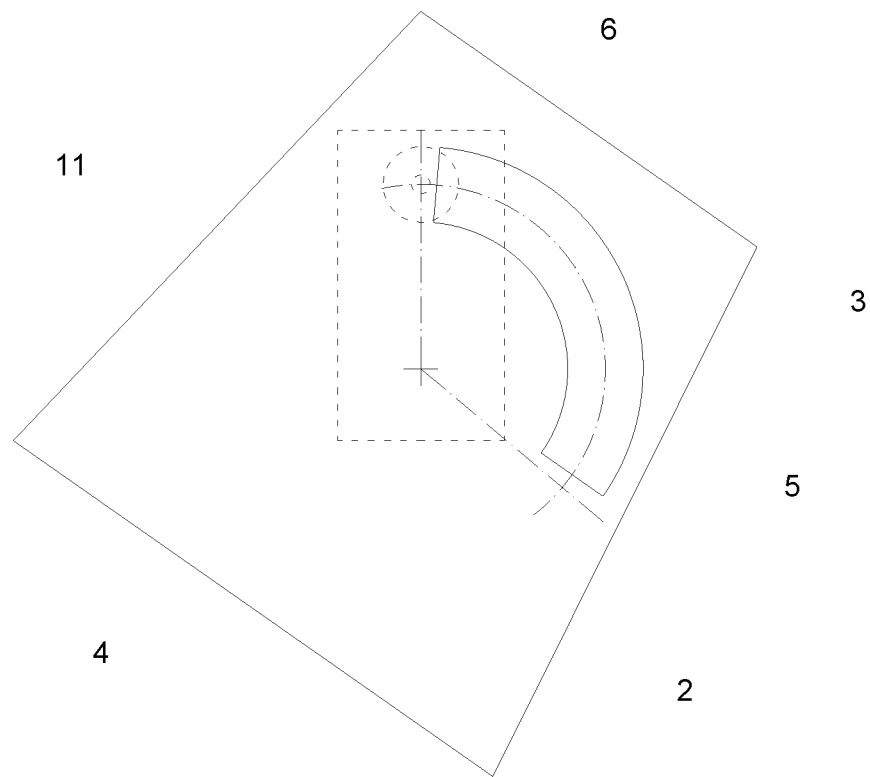
FIG. 5 shows the measuring device of FIG. 4 with the magnetic sensor and the permanent magnet in a second limit position relative to one another.

A schematic view of that situation is shown in FIGS. 3 to 5, where the main axis of rotation 4 is perpendicular to the sheet and where, for the sole purpose of highlighting the movements relative to one another, the rotating body 3 has been shown with a trapezoidal design and the supporting body 2 with a rectangular design.

The measuring device 1 also comprises a permanent magnet 5 and a magnetic sensor 6 which are fixed one to the rotating body 3 and the other to the supporting body 2. The permanent magnet 5 and the magnetic sensor 6 are also positioned in such a way that the magnetic sensor 6 is magnetically coupled to the permanent magnet 5 in any position relative to one another adopted by the supporting body 2 and by the rotating body 3 during the rotation of the rotating body 3 relative to the supporting body 2. According to a first significant aspect of this invention, in the plane perpendicular to the main axis of rotation 4, the permanent magnet 5 extends along an arc of extension that corresponds to an arc of a circle centred on the main axis of rotation 4. Consequently, relative to the main axis of rotation 4, the permanent magnet 5 extends through an angle of extension α that corresponds to the angle at the centre subtended by the arc of extension.

Figure 6:
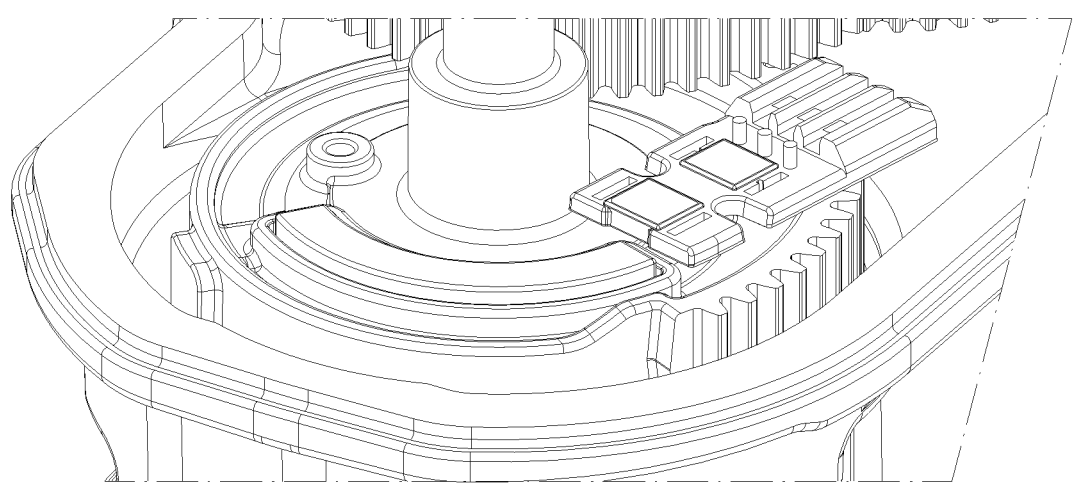
FIG. 6 is a partial axonometric view of the detail of a measuring device made according to this invention applied at an oscillating body of an apparatus.

Advantageously, in the preferred embodiments the magnet is shaped in such a way that, if seen axially (that is to say, parallel to the main axis of rotation 4), it has the shape of a piece of a ring. In 3D it may advantageously correspond a piece of a toroidal solid, which in the embodiment in FIG. 6 for example has a substantially rectangular cross-section (with the exception of small bevels at the edges). In this case, the permanent magnet 5 has a flat upper face 7 and a flat lower face 8 which are substantially equal and parallel, a curved inner face 9 facing the main axis of rotation 4 and parallel to it, a curved outer face 10 parallel to the curved inner face 9, and two end faces 11 which each lie in their own plane passing through the main axis of rotation 4. The angle between those two lying planes of the end faces 11 corresponds to the angle of extension α of the permanent magnet 5. Moreover, in that embodiment, as in all similar ones, the arc of extension may be identified with the arc that joins the central points (barycentres) of each individual cross-section of the toroidal solid.

As regards the thickness of the magnet parallel to the main axis of rotation 4, and its radial width, they can be set each time based on design requirements.

Figure 2:
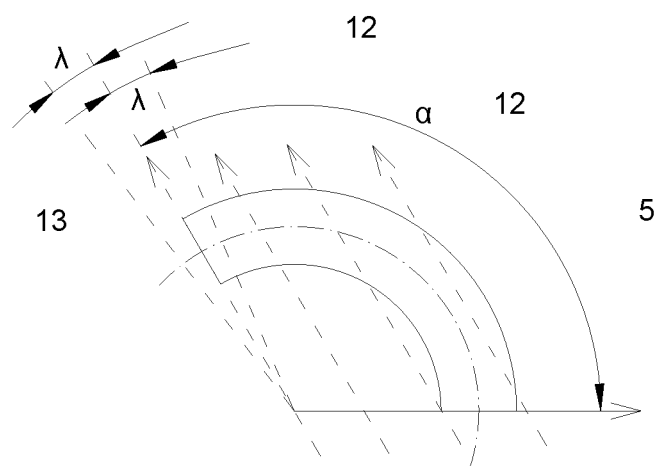
FIG. 2 is a schematic plan view of the direction of magnetization of the permanent magnet.

According to an inventive aspect of this invention, the permanent magnet 5 is diametrally polarized (that is to say, always parallel to itself through the whole of the magnet) and has a direction of polarization 12 that forms an angle λ that is less than or equal to 10°, preferably less than 5°, relative to a reference straight line 13 perpendicular to the main axis of rotation 4 and passing both through the main axis of rotation 4, and through a first end of the arc of extension. In the case illustrated in FIG. 2, the reference straight line 13 is the radial straight line relative to the axis of rotation, which passes through the central point of one of the end faces 11 (which of the two does not matter, even given the substantial symmetry of the permanent magnet 5).

The magnetic sensor 6 is positioned eccentrically relative to the main axis of rotation 4 and, preferably, is a Hall effect magnetic sensor 6 able to detect the intensity of the components of magnetic induction along two or three orthogonal detecting axes. It will preferably be positioned in such a way that two of its detecting axes line in a plane perpendicular to the main axis of rotation 4.

In order to guarantee the magnetic coupling between the magnetic sensor 6 and the permanent magnet 5, the magnetic sensor 6 is preferably directly facing the permanent magnet 5 at least when the rotating body 3 and the supporting body 2 are positioned relative to one another at a central zone of the angle of oscillation (with a small gap between them, whose size will depend both on the intensity of the magnetic field generated by the permanent magnet 5 and on the sensitivity of the magnetic sensor 6, and will preferably be selected in such a way that the magnetic sensor 6 is immersed in a magnetic field with intensity that the magnetic sensor 6 can perceive). Depending on requirements, the magnetic sensor 6 may be spaced from the permanent magnet 5 alternatively either along a line that is parallel to axis of rotation (as in the accompanying figures, in which it is facing either the flat upper face 7 or the flat lower face 8) or along a line that is radial relative to the axis of rotation (and, therefore, alongside the magnet either on the inside—facing the curved inner surface 9—or on the outside—facing the curved outer surface 10).

According to a further innovative aspect of this invention, the following relation applies between the angle of extension α of the permanent magnet 5 and the angle of oscillation θ:

$$\alpha > \theta - 30°$$

preferably also the relation:

$$\alpha < \theta + 25°$$

even more preferably the relation:

$$\alpha < \theta + 20°$$

and yet more preferably the relation:

$$\alpha < \theta + 10°.$$

However, more preferably, the angle of extension α of the permanent magnet 5 is less than and the angle of oscillation θ, that is to say, the following relation applies:

$$\alpha < \theta.$$

In the preferred embodiment, in particular, the following relation applies between the angle of extension α of the permanent magnet 5 and the angle of oscillation θ:

$$\alpha = \theta - 2\delta$$

with $\delta = 5° \pm 2°$.

Furthermore, the permanent magnet 5 and the magnetic sensor 6 are preferably positioned relative to each other in such a way that the stroke of the magnetic sensor 6 relative to the permanent magnet 5 is substantially symmetrical relative to a plane passing through the bisector of the angle of extension α and through the main axis of rotation 4.

In other words, during the rotation of the rotating body 3 relative to the supporting body 2, the magnetic sensor 6 shifts relative to the permanent magnet 5, in the plane that is perpendicular to the main axis of rotation 4, along an arc of oscillation that corresponds to an arc of a circle centred on the main axis of rotation 4 and that subtends an angle at the centre that is equal to the angle of oscillation θ. Moreover, the angle of oscillation θ and the angle of extension α are arranged with their bisectors coplanar in a half-plane coming out of the main axis of rotation 4.

As can be seen in FIG. 1, in the preferred embodiment in which the angle of oscillation θ is greater than the angle of extension α, the stroke of the magnetic sensor 6 at each end face of the permanent magnet 5, continues beyond the permanent magnet 5 by an additional angle equal to δ=5°±2°.

Operation of the device 1 for measuring an angular position according to this invention is similar to that of a common measuring device 1.

Figure 7:
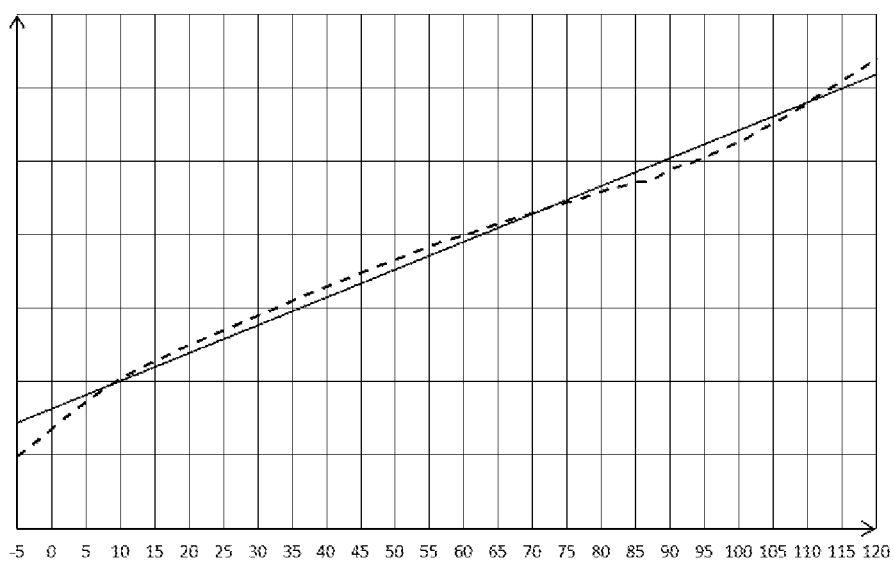
FIG. 7 shows with a dashed line an example of an output signal obtainable using a measuring device according to this invention and shows with an unbroken line the same signal adjusted for subsequent use.

FIG. 7 in particular highlights with a dashed line an example of the output signal obtainable from the magnetic sensor 6 of a measuring device 1 made according to this invention, and in which the angle of oscillation θ is equal to 125°, the angle of extension α is equal to 115° and in which the direction of polarization 12 corresponds to the above-mentioned reference direction passing through one of the end faces 11 of the permanent magnet 5.

Also in FIG. 7, the unbroken line shows the linearization of the output of the magnetic sensor 6, obtained with the normal calculation and correction techniques adopted in the sector.

This invention brings important advantages.

In fact, thanks to this invention it has been possible to make a device for measuring an angular position that allows the combining of a continuous measuring signal (without interruptions over the whole measuring range) with a relatively high level of sensitivity.

Furthermore, if the angle of extension is selected as being less than the angle of oscillation, it is possible to obtain those results at an extremely low cost.

Finally, it should be noticed that this invention is relatively easy to produce and that even the cost linked to implementing the invention is not very high.

The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. A device for measuring an angular position, comprising:
   a supporting body (2);
   a rotating body (3) that oscillates relative to the supporting body (2) about a main axis of rotation (4), between two limit positions which are rotated one relative to the other by an angle of oscillation θ with amplitude that is less than or equal to 150°,
   a permanent magnet (5) that lies mainly in a plane that is perpendicular to the main axis of rotation (4), and extends in that plane along an arc of extension that corresponds to an arc of a circle centred on the main axis of rotation (4) and through an angle of extension α that corresponds to the angle at the centre subtended by said arc of the circle centred on the main axis of rotation (4); and
   a magnetic sensor (6) positioned eccentrically relative to the main axis of rotation (4);
   the permanent magnet (5) and the magnetic sensor (6) being fixed one to the rotating body (3) and the other to the supporting body (2), and being positioned in such a way that the magnetic sensor (6) is magnetically coupled to the permanent magnet (5) in any mutual position adopted by the supporting body (2) and by the rotating body (3) during the rotation of the rotating body (3) relative to the supporting body (2);
   wherein:
   the following relation applies between the angle of extension α of the permanent magnet (5) and the angle of oscillation θ:

$$\alpha > \theta - 30°$$

and wherein the permanent magnet (5) is diametrically polarized and has a direction of polarization (12) that forms an angle that is less than or equal to 10° relative to a straight line perpendicular to the main axis of rotation (4) and passing both through the main axis of rotation (4), and through a first end of the arc of extension.

2. The device according to claim 1, wherein the following relation applies between the angle of extension α of the permanent magnet (5) and the angle of oscillation θ:

$$\alpha < \theta + 10°.$$

3. The device according to claim 1, wherein the following relation applies between the angle of extension α of the permanent magnet (5) and the angle of oscillation θ:

$$\alpha < \theta.$$

4. The device according to claim 1, wherein the following relation applies between the angle of extension α of the permanent magnet (5) and the angle of oscillation θ:

$$\alpha = \theta - 2\delta$$

with δ=5°±2°.

5. The device according to claim 1, wherein, during the rotation of the rotating body (3) relative to the supporting body (2), the magnetic sensor (6) shifts relative to the permanent magnet (5) in a plane that is perpendicular to the main axis of rotation (4) along an arc of oscillation that corresponds to an arc of a circle centred on the main axis of rotation (4) and that subtends an angle at the centre that is equal to the angle of oscillation θ; the angles at the centre which are subtended by the angle of oscillation and by the angle of extension being positioned with their respective bisectors coplanar in a half-plane coming out of the main axis of rotation (4).

6. The device according to claim 2, wherein, during the rotation of the rotating body (3) relative to the supporting body (2), the magnetic sensor (6) shifts relative to the permanent magnet (5) in a plane that is perpendicular to the main axis of rotation (4) along an arc of oscillation that corresponds to an arc of a circle centred on the main axis of rotation (4) and that subtends an angle at the centre that is equal to the angle of oscillation θ; the angles at the centre which are subtended by the angle of oscillation and by the angle of extension being positioned with their respective bisectors coplanar in a half-plane coming out of the main axis of rotation (4).

7. The device according to claim 3, wherein, during the rotation of the rotating body (3) relative to the supporting body (2), the magnetic sensor (6) shifts relative to the permanent magnet (5) in a plane that is perpendicular to the main axis of rotation (4) along an arc of oscillation that corresponds to an arc of a circle centred on the main axis of rotation (4) and that subtends an angle at the centre that is equal to the angle of oscillation θ, the angles at the centre which are subtended by the angle of oscillation and by the angle of extension being positioned with their respective bisectors coplanar in a half-plane coming out of the main axis of rotation (4).

8. The device according to claim 4, wherein, during the rotation of the rotating body (3) relative to the supporting body (2), the magnetic sensor (6) shifts relative to the permanent magnet (5) in a plane that is perpendicular to the main axis of rotation (4) along an arc of oscillation that corresponds to an arc of a circle centred on the main axis of rotation (4) and that subtends an angle at the centre that is equal to the angle of oscillation θ; the angles at the centre which are subtended by the angle of oscillation and by the angle of extension being positioned with their respective bisectors coplanar in a half-plane coming out of the main axis of rotation (4).

9. The device according to claim 1, wherein the direction of polarization (12) forms an angle that is less than or equal to 5°, relative to said straight line perpendicular to the main axis of rotation (4) and passing both through the main axis of rotation (4) and through the first end of the arc of extension.

10. The device according to claim 1, wherein the magnetic sensor (6) is a Hall-effect magnetic sensor (6) able to detect the intensity of the components of the magnetic induction along two or three orthogonal axes of detection.

11. The device according to claim 1, wherein the magnetic sensor (6) is directly facing the permanent magnet (5) at least at the central zone of the angle of oscillation and is spaced from it alternatively either along a direction parallel to the axis of rotation or along a direction radial relative to the axis of rotation.

12. The device according to claim 1, wherein the rotating body (3) oscillates relative to the supporting body (2) about the main axis of rotation (4), between two limit positions which are rotated one relative to the other by an angle of oscillation θ with amplitude that is greater than or equal to 90°.

13. The device according to claim 2, wherein the rotating body (3) oscillates relative to the supporting body (2) about the main axis of rotation (4), between two limit positions which are rotated one relative to the other by an angle of oscillation θ with amplitude that is greater than or equal to 90°.

14. The device according to claim 3, wherein the rotating body (3) oscillates relative to the supporting body (2) about the main axis of rotation (4), between two limit positions which are rotated one relative to the other by an angle of oscillation θ with amplitude that is greater than or equal to 90°.

15. The device according to claim 4, wherein the rotating body (3) oscillates relative to the supporting body (2) about the main axis of rotation (4), between two limit positions which are rotated one relative to the other by an angle of oscillation θ with amplitude that is greater than or equal to 90°.

16. The device according to claim 5, wherein the rotating body (3) oscillates relative to the supporting body (2) about the main axis of rotation (4), between two limit positions which are rotated one relative to the other by an angle of oscillation θ with amplitude that is greater than or equal to 90°.

17. The device according to claim 7, wherein the rotating body (3) oscillates relative to the supporting body (2) about the main axis of rotation (4), between two limit positions which are rotated one relative to the other by an angle of oscillation θ with amplitude that is greater than or equal to 90°.

18. The device according to claim 8, wherein the rotating body (3) oscillates relative to the supporting body (2) about the main axis of rotation (4), between two limit positions which are rotated one relative to the other by an angle of oscillation θ with amplitude that is greater than or equal to 90°.

19. The device according to claim 9, wherein the rotating body (3) oscillates relative to the supporting body (2) about the main axis of rotation (4), between two limit positions which are rotated one relative to the other by an angle of oscillation θ with amplitude that is greater than or equal to 90°.

* * * * *